US007754004B2

(12) United States Patent
Ohlhausen et al.

(10) Patent No.: US 7,754,004 B2
(45) Date of Patent: Jul. 13, 2010

(54) THICKENED SURFACTANT-FREE CLEANSING AND MULTIFUNCTIONAL LIQUID COATING COMPOSITIONS CONTAINING NONREACTIVE ABRASIVE SOLID PARTICLES AND AN ORGANOSILANE QUATERNARY COMPOUND AND METHODS OF USING

(75) Inventors: Howard G. Ohlhausen, Paradise Valley, AZ (US); Jerome H. Ludwig, Sun City West, AZ (US)

(73) Assignee: Resource Development, L.L.C., Scottsdale, AZ (US)

( * ) Notice: Subject to any disclaimer, the term of this patent is extended or adjusted under 35 U.S.C. 154(b) by 595 days.

(21) Appl. No.: 11/753,779

(22) Filed: May 25, 2007

(65) Prior Publication Data
US 2007/0227557 A1 Oct. 4, 2007

Related U.S. Application Data

(63) Continuation-in-part of application No. 11/175,583, filed on Jul. 6, 2005, now Pat. No. 7,704,313.

(51) Int. Cl.
C11D 3/30 (2006.01)
(52) U.S. Cl. .................. 106/287.11; 510/369; 510/384; 510/404; 510/466; 510/504
(58) Field of Classification Search ................ 510/369, 510/384, 404, 466, 504; 106/287.11
See application file for complete search history.

(56) References Cited

U.S. PATENT DOCUMENTS

| 2,612,458 A | 9/1952 | Stedman |
| 2,923,653 A | 2/1960 | Matlin et al. |
| 2,962,390 A | 11/1960 | Fain et al. |
| 3,130,164 A | 4/1964 | Best |
| 3,244,541 A | 4/1966 | Fain et al. |
| 3,560,385 A | 2/1971 | Roth |
| 3,579,540 A | 5/1971 | Ohlhausen |
| 3,730,701 A | 5/1973 | Isquith et al. |
| 3,794,736 A | 2/1974 | Abbott et al. |
| 3,817,739 A | 6/1974 | Abbot et al. |
| 3,860,709 A | 1/1975 | Abbott et al. |
| 3,865,728 A | 2/1975 | Abbott et al. |
| 4,005,025 A | 1/1977 | Kinstedt |
| 4,005,028 A | 1/1977 | Heckert et al. |
| 4,005,030 A | 1/1977 | Heckert et al. |
| 4,161,518 A | 7/1979 | Wen et al. |
| 4,259,103 A | 3/1981 | Malek et al. |
| 4,282,366 A | 8/1981 | Eudy |
| 4,311,598 A | 1/1982 | Verachtert |
| 4,361,273 A | 11/1982 | Levine et al. |
| 4,390,712 A | 6/1983 | Karl et al. |
| 4,394,378 A | 7/1983 | Klein |
| 4,397,757 A | 8/1983 | Bright et al. |
| 4,406,892 A * | 9/1983 | Eudy ............................. 514/63 |
| 4,421,796 A | 12/1983 | Burril et al. |
| 4,430,236 A | 2/1984 | Franks |
| 4,467,013 A | 8/1984 | Baldwin |
| 4,557,854 A | 12/1985 | Plueddemann |
| 4,567,039 A | 1/1986 | Stadnick et al. |
| 4,576,728 A | 3/1986 | Stoddart |
| 4,615,882 A | 10/1986 | Stockel |
| 4,631,273 A | 12/1986 | Blehm et al. |
| 4,682,992 A | 7/1987 | Fuchs |
| 4,781,974 A | 11/1988 | Bouchette et al. |
| 4,797,420 A | 1/1989 | Bryant |
| 4,835,019 A | 5/1989 | White et al. |
| 4,842,766 A | 6/1989 | Blehm et al. |
| 4,847,088 A | 7/1989 | Blank |
| 4,866,192 A | 9/1989 | Plueddemann et al. |
| 4,908,355 A * | 3/1990 | Gettings et al. ................ 514/63 |
| 4,941,989 A | 7/1990 | Kramer et al. |
| 4,990,377 A | 2/1991 | Wilson |
| 4,999,249 A | 3/1991 | Deschler et al. |
| 5,013,459 A | 5/1991 | Gettings et al. |
| 5,209,775 A | 5/1993 | Bank et al. |
| 5,281,357 A | 1/1994 | Morgan et al. |
| 5,320,805 A | 6/1994 | Kramer et al. |
| 5,348,556 A | 9/1994 | Minns et al. |
| 5,360,568 A | 11/1994 | Madison et al. |
| 5,360,569 A | 11/1994 | Madison et al. |
| 5,411,585 A | 5/1995 | Avery et al. |
| 5,426,204 A | 6/1995 | Harisiades et al. |
| 5,478,357 A | 12/1995 | Madison et al. |
| 5,552,476 A | 9/1996 | Halling |
| 5,620,527 A | 4/1997 | Kramer et al. |
| 5,798,144 A | 8/1998 | Varanasi et al. |

(Continued)

FOREIGN PATENT DOCUMENTS

| AU | 493149 B2 | 5/1978 |
| CA | 1010782 | 5/1977 |
| CA | 1217004 | 1/1987 |
| DE | 19538629 A1 | 4/1997 |
| EP | 0051823 A1 | 5/1982 |
| EP | 0129980 A1 | 1/1985 |
| EP | 1741773 A | 1/2007 |
| WO | 9619558 | 6/1996 |
| WO | 00/54587 A1 | 9/2000 |
| WO | 00/72850 A1 | 12/2000 |
| WO | 2005042657 | 5/2005 |

OTHER PUBLICATIONS

Radell et al., Occlusion of Organosilanes by Urea, Journal of the American Chemical Society, vol. 80, pp. 2683-2685 (1958).

*Primary Examiner*—Margaret G Moore
(74) *Attorney, Agent, or Firm*—Wood, Herron & Evans, L.L.P.

(57) ABSTRACT

Cleansing and multifunctional coating compositions containing an organosilane quaternary compound, nonreactive abrasives, thickeners and, optionally, hydrogen peroxide, in aqueous formulations are used to improve water and soil repellency and residual antimicrobial activity on surfaces. Various surfaces may be treated including metal, glass, plastics, rubber, porcelain, ceramic, marble, granite, cement, tile, sand, silica, enameled appliances, polyurethane, polyester, polyacrylic, melamine/phenolic resins, polycarbonate, painted surfaces, wood, and the like.

56 Claims, No Drawings

U.S. PATENT DOCUMENTS

| | | | |
|---|---|---|---|
| 5,885,951 | A | 3/1999 | Loder |
| 5,954,869 | A | 9/1999 | Elfersy et al. |
| 5,959,014 | A | 9/1999 | Liebeskind et al. |
| 6,087,319 | A | 7/2000 | Norman |
| 6,113,815 | A | 9/2000 | Elfersy et al. |
| 6,120,587 | A | 9/2000 | Elfersy et al. |
| 6,218,351 | B1 | 4/2001 | Busch et al. |
| 6,221,944 | B1 | 4/2001 | Liebeskind et al. |
| 6,240,929 | B1 | 6/2001 | Richard et al. |
| 6,309,425 | B1 | 10/2001 | Murphy |
| 6,316,399 | B1 | 11/2001 | Melikyan et al. |
| 6,346,279 | B1 | 2/2002 | Rochon |
| 6,361,787 | B1 | 3/2002 | Shaheen et al. |
| 6,372,702 | B1 | 4/2002 | Chiou et al. |
| 6,376,448 | B1 | 4/2002 | Colurciello, Jr. et al. |
| 6,391,840 | B1 | 5/2002 | Thompson et al. |
| 6,403,547 | B1 | 6/2002 | Grippaudo et al. |
| 6,417,151 | B1 | 7/2002 | Grothus et al. |
| 6,432,181 | B1 | 8/2002 | Ludwig |
| 6,436,445 | B1 | 8/2002 | Hei et al. |
| 6,461,537 | B1 | 10/2002 | Turcotte et al. |
| 6,528,472 | B2 | 3/2003 | Charaf et al. |
| 6,530,384 | B1 | 3/2003 | Meyers et al. |
| 6,534,075 | B1 | 3/2003 | Hei et al. |
| 6,548,467 | B2 | 4/2003 | Baker et al. |
| 6,559,111 | B2 | 5/2003 | Colurciello, Jr. et al. |
| 6,610,777 | B1 | 8/2003 | Anderson et al. |
| 6,613,755 | B2 | 9/2003 | Peterson et al. |
| 6,676,733 | B2 | 1/2004 | Ludwig et al. |
| 6,740,626 | B2 | 5/2004 | Neumiller |
| 6,809,072 | B2 | 10/2004 | Abidh et al. |
| 6,881,247 | B2 | 4/2005 | Batdorf |
| 6,897,191 | B2 | 5/2005 | Batdorf |
| 6,994,890 | B2 * | 2/2006 | Ohlhausen et al. ........ 427/393.4 |
| 7,151,139 | B2 | 12/2006 | Tiller et al. |
| 7,183,434 | B2 | 2/2007 | Baan et al. |
| 2005/0089695 | A1 | 4/2005 | Moffat et al. |
| 2006/0110348 | A1 | 5/2006 | Ohlhausen et al. |
| 2007/0010419 | A1 | 1/2007 | Ohlhausen et al. |

* cited by examiner

US 7,754,004 B2

THICKENED SURFACTANT-FREE CLEANSING AND MULTIFUNCTIONAL LIQUID COATING COMPOSITIONS CONTAINING NONREACTIVE ABRASIVE SOLID PARTICLES AND AN ORGANOSILANE QUATERNARY COMPOUND AND METHODS OF USING

RELATED APPLICATION

This application is a continuation-in-part application of U.S. patent application Ser. No., 11/175,583 now U.S. Pat. No. 7,704,313, filed on Jul. 6, 2005, which is U.S. Publication No. 2007/0010419, published Jan. 11, 2007. The entire disclosure of the above-referenced Patent Application/Publication is incorporated herein by reference.

FIELD OF THE INVENTION

This invention relates to a thickened liquid cleansing composition that removes water and oil insoluble buildup and microbial contamination from everyday surfaces, particularly hard surfaces, and which simultaneously imparts a multifunctional coating on the cleansed surface to render it water and soil repellent, as well as antimicrobial. Nonreactive abrasive solid particles are formulated with organosilane quaternary nitrogen compounds into surfactant-free compositions which contain a thickener to provide the cleansing and multifunctional coating composition.

BACKGROUND OF THE INVENTION

Rain and coastal spray from lakes and oceans contain enough dissolved gases, carbonic acid, chlorides, sulfates, nitrates, ammonia and particulate matter to make them chemically active. Similarly, most ground and municipally supplied water, while generally safe for drinking, cooking, washing and bathing, still contains enough salts, hard water minerals, bacteria, organic and inorganic contaminates and chlorinated water treatment chemicals to also be chemically active.

When either source of water is allowed to evaporate on most siliceous and nonsiliceous surfaces such as glass, porcelain, ceramic, marble, granite, polyurethane, polyester, polyacrylic, melamine/phenolic resins and polycarbonate, it combines with ordinary soil to promote the formation, adhesion and build-up of insoluble mineral deposits, lime scale, rust, soap scum and foodstuff. This ongoing exposure to chemically active water contributes directly to increased soil buildup and to the costly surface damaging cycle that results from scraping and scrubbing with harsh cleaners and cleansers to remove the insoluble soil.

Thus, until rain, ground and municipally furnished water is completely deionized and demineralized, any exterior glass (such as windows, patio doors and store fronts) exposed to rain or spray from oceans, lakes and ground sprinklers, etc. and any kitchen and bath surface (such as windows, sinks, counters, ranges, ovens, cooking and washing appliances, bathtubs and shower enclosures) exposed to tap water and water-containing spills and splatters that are allowed to evaporate on the surface remain subject to the formation, adhesion and buildup of insoluble soil.

To remove insoluble soil, homemakers and cleaning professionals have turned to stronger and stronger cleaning aids including powerful acids, alkalis and a broad range of abrasive cleansers. The inevitable result of using such harsh cleaning aids is a surface destroying cycle. The stronger the cleaning action, the more it opens the microscopic pores and increases the hydrophilicity of the surface. The more open and vulnerable the pores, the deeper the new soil penetrates and the greater its adhesion and build-up, and the stronger the cleaning action required to remove the soil with greater and greater destruction of the surface finish. Although microscopic at first, this cycle ultimately leads to surfaces that are visibly rough, exhibit the loss of color and sheen, and become more prone to soiling and microbiological contamination.

Traditional abrasive powders and creams (such as Kitchen Kleanser®, Comet®, Ajax®, Bon Ami®, Zud®, Bar Keepers Friend®, Soft Scrub®, Glass Scrub® and Miracle Scrub®) cleanse the surface of buildup by scraping and scrubbing the soil primarily with a surfactant and mechanical action. While such cleansers are more or less effective in removing the soil and microbial buildup, they typically leave a surface that has become more microscopically irregular, more water wettable (hydrophilic) and more prone to the adhesion and buildup of new soil and microbial contamination.

Also, it is well known that bacteria (like e-coli and salmonella, etc.), virus (like the norovirus and herpes, etc.) and fungi (like mold and mildew, etc.) can be effectively mitigated with a broad range of sterilants, disinfectants and sanitizers. It is also known that hydrogen peroxide, ethyl alcohol, isopropyl alcohol and quaternary compounds are effective sterilants, disinfectants and sanitizers.

However, both traditional abrasive cleansers to remove insoluble buildup and sterilants, disinfectants and sanitizers to kill disease-producing microorganisms are typically only one-time compositions that provide no long term protection against soil buildup or microbial contamination. In fact, in our fast paced, fast moving society, the resoiling and recontamination of everyday surfaces is an ongoing, continuing and virtually instant process.

Although abrasive cleansers also remove microbial contamination while removing insoluble buildup from surfaces, the reverse is not true for sterilants, disinfectants and sanitizers that are usually ineffective against either the formation, adhesion and buildup of insoluble soil or its removal. Consequently, in terms of surface care, the use of abrasive cleansers negates any residual anti-microbial activity that may result from the use of sterilants, disinfectants or sanitizers.

It has been established that water and soil repellent surfaces significantly reduce the formation, adhesion and buildup of insoluble soil and that the water and soil repellency of surfaces can be improved by the use of silicone compositions. There has been extensive research and development involving silicone compositions for rendering surfaces water repellent. For example, U.S. Pat. No. 2,612,458 (Stedman) discloses the application of substituted polysilicanes to windshields to achieve repellency. U.S. Pat. No. 2,923,653 (Matlin et al.) discloses improved compositions employing alkoxy groups in the polysilicane to improve the repellency. U.S. Pat. No. 2,962,390 (Fain et al.) describes a paste containing a solid rubbing agent and an alkyl alkoxy silane which when rubbed on a glass surface provides repellency. U.S. Pat. No. 3,244,541 (Fain et al.) discloses acidic solutions of alkyl alkoxy silane monomers that produce rain repellent films on glass and which are also solvent resistant.

U.S. Pat. No. 3,579,540 (Ohlhausen) discloses water repellent film-forming compositions of alkylpolysiloxanes and acid, or alkylpolysiloxanes, acid and solvent which result in durable and effective water repellent films on various surfaces. It was the practical application of the 1971 '540 patent that spawned hundreds of products, many of which are still being manufactured and marketed for home, auto and commercial uses today. Some non-limiting examples are Rain- X®, Invisible Shield®, Rain Clear®, Shower Shield®, Clear Shield®, Hydro Shield®, Rain Vision®, Rain Away®, Crystal Coat®, Water Shield®, Poly Glass®, Surface Shield®, Glass Coat®, Slick Shield®, Micro Plus® and others.

Further improvements in solvent/VOC free compositions for treating porous and nonporous surfaces have been made as disclosed in U.S. Pat. No. 6,432,181 (Ludwig and Ohlhausen). The '181 patent satisfied a need which existed for soil and water repellent compositions that eliminate solvents and utilize the silicone more effectively and economically. Additional improvements in soil and water repellent compositions were made by providing physiologically acceptable compositions that were non-corrosive and non-irritating to the eyes and skin of the user in accordance with Federal Hazardous Substances Act and Consumer Product Safety Commission 16 CFR 1500 Guidelines as disclosed in U.S. Pat. No. 6,676,733 (Ludwig and Ohlhausen).

Many different types of hard and soft surfaces have also been cleaned of soluble soil, provided with a water and soil repellent finish and rendered antimicrobial by coating with different agents. For example, U.S. Pat. No. 6,994,890, which issued on Feb. 7, 2006 (Ohlhausen and Ludwig), discloses a "Cleaning and Multifunctional Coating Composition Containing An Organosilane Quaternary Compound and Methods of Using" from aqueous systems with hydrogen peroxide. Although such compositions are exceptionally effective in removing water and oil soluble soil from surfaces while simultaneously providing a water and soil repellent barrier coating for easier cleaning and to reduce microbial contamination, they do not satisfactorily or completely remove insoluble buildup.

Organosilane quaternary nitrogen compounds have been employed effectively in eliminating and/or reducing microbial contamination when applied to a variety of surfaces. For instance, bacterial, viral and fungal contamination may be eliminated or reduced when such organosilane quaternary compounds are applied to surfaces. Commercially available quaternary ammonium organosilanes which have been used for this purpose include 3-(trimethoxysilyl)propyldimethyloctadecyl ammonium chloride, 3-(trimethoxysilyl)propyldidecylmethyl ammonium chloride, and 3-(trimethoxysilyl)propyltetradecyldimethyl ammonium chloride. The following patents and patent applications disclose the use of siliconized and/or non-siliconized quaternaries, solvents and surfactants/detergents for the cleaning and/or water repellent treatment of substrates: U.S. Pat. No. 4,005,028; U.S. Pat. No. 4,005,030; U.S. Pat. No. 6,559,111; U.S. Pat. No. 6,897,191; U.S. Pat. No. 6,809,072; U.S. Publ. No. 2005/0089695; U.S. Publ. No. 2005/0020474; U.S. Publ. No. 2003/0109395; U.S. Pat. No. 6,881,247; U.S. Publ. No. 2002/0091641 and U.S. Pat. No. 5,426,204.

Notwithstanding the improvements that have been made over many decades of research and development regarding cleaning or coating compositions for various surfaces, there still exists the need for further improvements.

SUMMARY OF THE INVENTION

This invention is directed to a thickened surfactant-free storage stable liquid cleansing and multifunctional coating composition for treating everyday household, automotive and commercial surfaces.

In our earlier application, Ser. No.11/175,583, which is U.S. Publication No. 2007/0010419, published Jan. 11, 2007, we disclosed compositions consisting essentially of a cationic organosilane quaternary ammonium compound ("organosilane quat"), nonreactive abrasive solid particles and a liquid diluent. The organosilane quat is bondable onto the surface and the components of the composition are contained in effective amounts for cleansing the surface and for bonding the multifunctional coating onto the surface, thereby rendering it water and soil repellent, and antimicrobial.

We also disclosed compositions in the above-mentioned earlier application which may optionally contain an additive such as a thickener. This application is directed to further improvements in thickened multifunctional cleansing and coating compositions which retain their storage stability and are surfactant-free. It has been found that a thickener composition of an alkylaryl sulfonate and an ethoxylated alcohol provides a thixotropic, shelf stable, and easily applied aqueous formulation having multifunctional cleansing and coating activities. The compositions are storage stable and surfactant-free.

The surfactant-free compositions of this invention are environmentally friendly. More specifically, surfactants are known to enter our municipal water systems and significantly hinder water reclamation and water re-cycling. Unless thoroughly flushed from hard surfaces, surfactant residues actually promote soil buildup and allow bacteria, mold and mildew to grow. The surfactant-fee compositions of this invention satisfy much needed surface care compositions that mitigate all forms of organic and inorganic soil (including microorganisms). The compositions are non-toxic and do not negatively impact on air and water quality.

The thickener composition of this invention consists essentially of an ethoxylated alcohol and an alkylaryl sulfonate. The ethoxylated alcohol must have an HLB number of about 7 to about 11.The HLB number, as defined herein, is directly related to the ethylene oxide content of the nonionic molecule and exists on an arbitrary scale to indicate the contribution of the polar hydrophilic end and the nonpolar hydrophobic end of the nonionic molecule. The alkylaryl sulfonates include alkalimetal or ammonium salts which are water soluble. In the detailed description that follows, the synergistic combination of these components of the thickener has been demonstrated.

Liquid compositions of this invention are also free of a surfactant. Contrary to earlier teachings in the above Background of this invention, it has been found that organosilane quats can be employed with nonreactive abrasive solid particles to cleanse insoluble surface soil and simultaneously impart a water, soil and stain-repellent barrier coating. The barrier coating prevents the attachment and growth of microorganisms and reduces the formation, adhesion and buildup of water and insoluble water spots, minerals, soap scum, foodstuff, rust and lime scale.

In another form of the invention, the compositions contain hydrogen peroxide or a complex thereof which has been found to improve the cleansing of the surface and the bonding of the organosilane quat to the cleansed surface and contribute to the antimicrobial properties of coating. It has also been established with reference to our earlier application, Ser. No. 10/698,313, filed Oct. 31, 2003, which issued as U.S. Pat. No. 6,994,890 on Feb. 7, 2006, that the organosilane quat in combination with the hydrogen peroxide achieves synergistic bonding onto said surfaces.

As we reported in our earlier application, Ser. No. 1 1/175, 583, which is U.S. Publication No. 2007/0010419, published Jan. 11, 2007, it has been found, quite unexpectedly, that the abrasive solid particles of the composition, while grinding the surface and breaking up the insoluble buildup, did not simultaneously prevent the organosilane quat from condensing, cross-linking and/or polymerizing on the surface as an invisible water, soil and germ repellent barrier coating. In other words, it was surprising that a durable nano-film polymeric barrier coating could be formed and bonded to a surface—in situ—all the while abrasive solid particles (without surfactants and detergents) are being applied to and massaged on the soiled surface to remove the insoluble soil.

Generally, the composition contains the organosilane quat in an amount up to about 5% by weight, preferably up to 1% by weight and the abrasive particles are in an amount up to about 35% by weight, preferably about 5 to about 25% by weight. The inventive thickener composition is contained in an amount of from about 6 to about 25% by weight, with about 3 to 10% by weight sulfonate and about 3 to 5% by weight ethoxylated alcohol. When hydrogen peroxide or a complex thereof is employed, in general, the hydrogen peroxide content thereof is in an amount up to 8% by weight, preferably about 1 to about 3% by weight. The liquid diluent is preferably aqueous and usually consists of deionized water and/or an alcohol such as ethanol, propanol, butanol, or the like. Aqueous creams or gels are preferred having pHs on the order of about 2 to about 9. Above and below these pHs, nonreactivity of the components may be reduced, thereby diminishing the storage stability of the composition. Other additives may be included in the composition, such as, gelling agents, lubricants, and solvents, and mixtures thereof in amounts from about 6 to 70% by weight. The nonreactive abrasive particles may be coated or uncoated and typically consist of silicas ($SiO_2$), silicates, metal oxides, metal carbonates (calcium carbonate or coated calcium carbonate), clays, carbides, metal hydroxides (aluminum oxide, aluminum hydroxide), urea, ceramic microspheres, hollow glass microspheres, and plastics, having an average size on the order of about 5 to about 300 microns.

A further understanding of the invention, its various embodiments and operating parameters will be apparent with reference to the following detailed description.

DETAILED DESCRIPTION OF THE INVENTION

In accordance with the above summary, the objectives of this invention are to provide compositions and methods for simultaneously cleaning, disinfecting everyday surfaces and simultaneously applying a water, soil and germ repellent coating in essentially one step. The invention provides thickened compositions that are (1) safe to use and environmentally compliant, (2) high-performance, penetrating cleansers of insoluble soil, (3) broadband disinfectants, (4) bondable, durable water and soil repellents that are self-renewing (with each use) and resistant to removal by ordinary soaps, solvents and detergents, (5) effective on an extraordinary range of everyday household, commercial, industrial and vehicular surfaces, (6) storage stable and economical in terms of performance and coverage, and (7) that can be used or applied with ordinary wipe, rinse and dry techniques.

In accordance with the best mode of this invention, the thickened multifunctional cleansing and coating composition is storage stable and surfactant-free. The composition includes (a) a monomeric cationic organosilane quaternary ammonium compound which is bondable onto a surface, (b) nonreactive abrasive solid particles, (c) a thickener composition of an alkylaryl sulfonate and an ethoxylated alcohol, and, (d) a liquid diluent. Optionally, the composition contains hydrogen peroxide to improve cleansing, disinfecting and bonding of the organosilane quaternary ammonium compound. The thickener composition provides an enhanced thixotropic, shelf-stable and easily applied aqueous formulations of the inventive compositions. More particularly, the following detailed descriptions apply to the components of the multi-functional cleansing and coating compositions, their methods of use and other objectives of the invention.

Organosilane Quaternary Ammonium Compounds

The organosilane quats are defined by the formula:

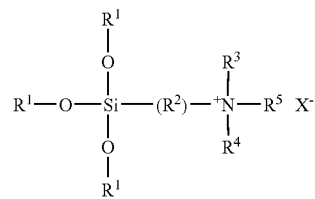

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_8$ to $C_{22}$ saturated or unsaturated hydrocarbon radical and X=halide (preferably chloride or bromide), carboxylate (acetate, glycolate), sulfonate, hydroxide, sulfate, or phosphate.

The organosilane quat is contained in an amount of up to about 5%, normally about 1 to 3%, preferably about 0.4-0.7% and the hydrogen peroxide is in an amount up to about 8%, preferably about 3 to 6%, in a deionized aqueous media. The pH of the aqueous media is about 2 to about 9, preferably acidic about 3 to 5. The composition may further contain a solvent selected from the group of an alcohol, polyol, glycolether and mixtures thereof, as mentioned above, more preferably, methanol, ethanol or isopropanol.

The cationic monomeric organosilane quaternary ammonium compound is selected from the group consisting of 3-(trimethoxysilyl)propyldimethyloctadecyl ammonium chloride (C-18Q), 3-(trimethoxysily)propyldimethyldodecyl ammonium chloride (C-12Q), 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleyl ammonium chloride (C-18=Q), 3-(trimethoxysilyl )propyloctadecyl ammonium chloride, 3-(trimethoxysilyl)propyloleyl ammonium chloride (C=18Q), 3-(trimethoxysilyl)propyldocosane ammonium chloride (C-22Q), and 3-(trimethoxysilyl)propyldimethyloctyl ammonium chloride (C-8Q).

Other suitable organosilane quats may be used, providing they function to clean and bond a multifunctional coating onto a surface.

In the preferred compositions of this invention the organosilane quaternary ammonium compounds facilitate the cleaning of the surface and also provide reactive groups for bonding with the surface to obtain the desired cleansing and multifunctional coating capabilities. Accordingly, it is preferred for the organosilane to have a hydrocarbon group such as a $C_8$-$C_{22}$ saturated or unsaturated hydrocarbon group which facilitates water repellent and antimicrobial activities.

Suitable quaternary organosilanes are described in further detail with reference to the following Examples. As stated above, in general, the compositions contain the organosilane quat in an amount up to about 5% by weight, preferably up to 1% by weight and the abrasive particles are in an amount up to 35% by weight, preferably about 5 to about 25% by weight. Optionally, when hydrogen peroxide or a complex thereof is employed, in general, the hydrogen peroxide content thereof is in an amount of up to about 8% by weight, preferably about 3 to about 6% by weight of the composition. More specific amounts for the most preferred organosilane quats, like 3(trimethoxysilyl)propyldimethyl-octadecyl ammonium chloride, are about 0.4 to about 0.7% by weight and up to about 3% by weight alone or with about 3% to 6% by weight of hydrogen peroxide.

Abrasive Solid Particles

Non-limiting examples of abrasive solid particles (grits) are shown on the following Table 1 together with the designation of their relative hardness (according to the Mohs Scale).

TABLE I

| Abrasive solid Particles | Hardness |
|---|---|
| Talc | 1 |
| Diatomaceous Earth | 1-1.5 |
| Vermiculite | 1.5 |
| Hydrated Alumina | 2.5-3.5 |
| Mica | 2.8 |
| Calcite | 3 |
| Barium Sulfate | 3-3.5 |
| Fluorite | 4 |
| Wollastonite | 4.5-5 |
| Zeolite Spneres (Glass) | 5-6 |
| Barite | 6 |
| Pumice | 6 |
| Tinanium Dioxide | 6-6.5 |
| Quartz (Silica) | 7 |
| Ceramic Microspheres | 7 |
| Zircon | 7.5 |
| Silicone Carbide | 9.2 |
| Aluminum Oxide | 9.5 |

By way of example and to provide a perspective on the hardness of the foregoing grits, the relative hardness of human fingernails is 2.25, silver is 2.5, glass is 4.5-5, topaz is 8, sapphire is 9 and diamond is 10. Most grits are available in many different particle sizes, and generally have an average particle size of about 5 to about 300 microns, with their abrasive quality varying inversely with their particle size, i.e., the smaller their size, the less abrasive their action on the soil and the underlying surface. Generally, for application to kitchen and bath surfaces, grits with a hardness of about 4.5 to 6 in the 5-300 average micron range are preferred. To cleanse and polish plastics and metals, grits in sizes of about 5 microns or less are preferred. It has also been established that even the hardest grits, when employed in average sizes of about 25 microns (passing a 600 mesh screen) or less on hard surfaces, do not impart scratches that can be seen without magnification. Moreover, due to the varying structure of grits (i.e., spherical, plate like, hollow, sharp, etc.), it is often desirable to employ a combination of grits of varying size and hardness to achieve the desired ability to abrade insoluble soil from everyday surfaces.

The grits must be nonreactive with the organosilane quat and the hydrogen peroxide or, if normally reactive, must be used in a form which has been rendered nonreactive with various available coatings; whereby the organosilane quat remains storage stable and available for bonding to the cleansed surface. Generally, the abrasive particles in the compositions are in an amount up to about 35% by weight where the organosilane quaternary compound is in an amount up to about 5% by weight. More preferably the abrasive particles are usually in an amount from about 5 to about 25% by weight where the quaternary compound is in an amount up to about 1% by weight, preferably about 0.4 to about 0.7% by weight.

Thickener Composition

The thickener composition of this invention consists essentially of an alkylaryl sulfonate and an ethoxylated alcohol. The alkylaryl sulfonates are water soluble as exemplified by sodium or ammonium alkylaryl sulfonates. It has been unexpectedly found that it is important to employ a sulfonate having a certain chemical structure. For example, the short chain alkyl sulfonates, such as sodium octane sulfonate, sodium alkyl($C_{11-16}$) sulfonate, and sodium lauryl ($C_{12}$) sulfonate did not result in stable thickened compositions in standard test formulations. In contrast, the sodium alkylaryl sulfonate such as sodium docecylbenzene sulfonate, and similar sodium alkylbenzene sulfonates did form stable thickened compositions. Furthermore, the ethoxylated alcohols (otherwise known as alcohol ethoxylates) must have an HLB number of about 7 to about 11, as demonstrated in the following examples. In the specific operating examples that follow, the ethoxylated alcohols (having the formula $R-O(CH_2CH_2O)_x$ H where $R=C_9-C_{15}$ and x=2.5 to about 12) which were operative include those having alkyl groups of $C_{11}$-$C_{15}$ and nonylphenol hydrophobic groups with 2.5 to 4 ethoxylated hydrophilic groups. It also has been demonstrated that the same hydrophobic groups with 5-12 ethoxylated hydrophilic groups do not yield the desired thickener activity, even at higher use levels, than those which do provide the desired thickening. As stated above, the thickener composition is generally contained in an amount of from about 6 to about 25% by weight, with a range of about 3 to 10% by weight sodium alkylaryl sulfonate and about 3 to 15% by weight ethoxylated alcohol.

Hydrogen Peroxide

While not desiring to be bound by theory, it is believed helpful for a further understanding of the invention to postulate a mechanism by which the cationic organosilane quaternary compound is bonded to the surface in the presence of hydrogen peroxide. Hydrogen peroxide is well known for its antimicrobial activity and its oxidizing power which has been used to destroy a variety of toxic pollutants. In aqueous solution it is a stronger acid than water with reference to the following equation:

However, it has not been known before this invention to combine hydrogen peroxide with an organosilane quat to obtain the cleaning, surface-activating and improved coating benefits described herein, especially the synergistic activities.

The organic cation also contains a silane function (—Si—OR) which can hydrolyze to a silanol (—Si—O—H), additional bonding of a chemical nature can occur with the substrate silanols on the substrate surfaces or to another organic cation silanol which would lead to polymerization and crosslinking of the organo quaternary compounds on the substrate surface. This chemical bonding and crosslinking lead to a more durable coating which is not easily removed from the substrate surface.

Non-limiting forms of hydrogen peroxide include urea peroxide, sodium percarbonate, calcium peroxide, magnesium peroxide, polyvinyl pyrrolidinone and ammonium fluoride peroxohydrate.

With the additional cleaning and surface-activating capability of hydrogen peroxide on anionic surfaces and its ability to strengthen the hydrogen bonding of the silane quaternary cation ($M^+$) to the anionic surface, thus facilitating the enhanced chemical bonding of the silane to the surface through condensation and subsequent crosslinking, an improved surface bonding or durability of the coating results from application of the compositions of this invention. It has been found that the combination of the cationic organosilane quaternary compound with hydrogen peroxide provides synergistic results. In other words, the resultant bonding and durability of this combination of components unexpectedly exceeds the summation of the individual components' activities, as demonstrated by Example 26 which follows.

Liquid Diluent

The liquid cleansing/coating compositions of this invention require a liquid diluent. The preferred liquid diluent is water or an alcohol, most preferably deionized water, which forms a medium for a slurry, cream or a gel with the organosilane quat, nonreactive abrasive solid particles, and thickener. Accordingly, the above stated relative amounts of the organosilane quat, abrasive solid particles, thickener, and optionally hydrogen peroxide, are provided with a balance of deionized water to form the slurry, cream or gel with other potential additives such as gelling agents, lubricants, fragrances and solvents. When the composition contains a solvent, it is usually selected from the group of an alcohol, polyol, glycol ether and mixtures thereof, more preferably ethanol or isopropanol.

Methodology

More particularly, the thickened inventive compositions cleanse a surface of insoluble soil, i.e., salts, pollutants, minerals, soap scum, hard water film, foodstuff, rust, bacteria, viruses, mold, mildew and biofilms thereof, and germs, and provide the surface with a bonded multifunctional barrier coating to reduce the adhesion and buildup of such soil and microorganisms for easier cleaning. The cleansing and coating composition contain a single type or blend of multiple abrasive solid particles. The thickener provides a desired thixotropic composition for ease of application and shelf stability. While the compositions abrade and clean the surface, the organosilane quaternary compounds concurrently bond to the surface to provide a water and soil repellent coating. The composition may contain hydrogen peroxide to improve bonding of the barrier coating to the surface, thickeners to provide thixotropic, shelf-stable creams and gels and lubricants to facilitate the breakup and removal of the insoluble soil that is now no longer attached to the surface. The components are used in effective amounts in aqueous media as slurries, creams or gels for cleansing a surface and for bonding a multifunctional barrier coating onto said surface thereby rendering it water, soil & stain repellent to reduce (a) the adhesion and buildup of hard water minerals, soap scum, foodstuffs and the like and (b) the attachment and growth of bacteria, virus and fungi.

Thus, the inventive cleansing and coating composition has unique dual-action properties which enable a surface to be cleansed of insoluble soil and simultaneously rendered water, soil and germ repellent. The dual-action properties enable cleansing and coating exterior windows soiled by rain, lake or ocean spray and ground sprinkler spray and/or pollution by dust, exhausts and smokestack emissions. Also, a broad range of interior surfaces that have been soiled with everyday spills and splatters of household soil that result from cooking, eating, washing, etc., and which soil has become water and oil insoluble, may be simultaneously cleansed and provided with a bonded coating that rather permanently repels water and soil while having antimicrobial properties.

As stated above, it is surprising that a durable nano-film polymeric barrier coating could be formed and bonded to a surface—in situ—all the while abrasive solid particles (without surfactants or detergents) are being wiped and massaged across/on the surface in a grinding action to remove the insoluble soil. The inventive composition containing the combination of the abrasive solid particles, organosilane quat, thickener, and hydrogen peroxide components provides unexpectedly improved bonding and durability of the barrier coating on various surfaces. In other words, the results achieved with the combined components in the composition exceeds the expected algebraic sum of the activity of each component when separately used on the surface. These synergistic activities contribute to the unique compositions and methods of this invention.

In general, the abrasive solid particles are selected on the basis of their hardness, sizes, structure and non-reactivity with the organosilane quaternary compound as well as stability with hydrogen peroxide when formulated as an aqueous slurry, cream or gel and are used in effective amounts, The cleansing and coating compositions may further contain thickeners and/or lubricants such as hydroxypropylcellulose, isopropyl myristate, mineral oil and the like; other water soluble polymers like polyvinylpyrrolidone (PVP), polyvinyl alcohol and polyethylene oxide. Further, preferably the aqueous media has a pH on the order of about 2 to about 9. The aqueous compositions are also preferably formulated with deionized water.

In accordance with the inventive methodology, everyday surfaces as found in homes, hotels, offices, stores, autos, ships, airplanes, etc. are treated with a composition that provides a cleansed surface and a multifunctional coating. For example, everyday surfaces that are soiled by the buildup of insoluble water spots, hard water film and minerals that results from rain, lake, ocean and sprinkler spray and the insoluble soap scum, limescale, stains and foodstuff that results from the spills and splatters from cooking, eating, washing, etc. may be cleansed and provided with the multifunctional coating upon application of the inventive composition. For example, a preferred slurry, cream or gel of the inventive composition can be applied by wiping and massaging onto a soiled surface in an effective amount to break up and loosen the soil which is removed by rinsing and then wiping the surface until it is dry. Upon such application, the surface is biomechanically cleansed and a multifunctional polymeric coating is formed and bonded onto the surface thereby providing an invisible, water, soil & stain repellent siliconized hydrocarbon barrier coating on which bacteria, virus, mold and mildew will not attach and grow and which restricts the formation, adhesion and buildup of hard water minerals, soap scum, foodstuff and stains for easier cleaning with water or non-abrasive aqueous cleaners.

The invention may be more readily understood by the following detailed disclosure of preferred embodiments of the invention. It is to be understood that the terminology used herein is for the purpose of describing particular embodiments and is not intended to be limiting. For the purpose of a clear understanding, the following terms, as used herein, are defined:

"abrasion resistant" refers to a surface, surface coating or finish that is resistant to damage or removal by washing, scraping or scrubbing with a mildly abrasive substance or process without visibly damaging the surface or finish, as in scratching or blemishing the surface.

"abrasive" or "abrasion" mean any material or substance used for grinding or polishing, and the spot or area on a surface that results from being ground, rubbed, agitated or massaged with abrasive "particle(s)" or "grit(s)".

"antimicrobial" means the ability of a surface and its coating to resist the attachment and growth of microorganisms; particularly those that are disease-causing.

"application", "applying" or "applied" as used herein means the treatment of a surface with the liquid cleansing coating composition, usually a slurry, cream or gel.

"bacteria" means ubiquitous one-celled organisms that appear singly or in chains and are comprised of various species involved in fermentation, putrefaction and infectious diseases.

"biomechanical™" or "biomechanically" means a method, process or composition that effectively cleans, sanitizes and shields surfaces in 1-step, particularly hard surfaces, using aqueous systems or biologically-active chemistries with sufficient non-destructive mechanical action to leave surfaces residue-free, but protected with invisible barrier coatings that reduce the adhesion and buildup of re-soiling and growth of bacteria, mold and mildew from re-contamination.

"bond", "bonded" or "bondable" means the ability to strongly adhere the composition to the surface, as in the ability to bond a water & soil repellent finish, coating or characteristic to an otherwise water and soil accepting surface. As used herein, the composition is deemed "bonded" or "bondable" when it is resistant to removal by soaps, solvents, detergents or abrasive-type cleansers that would not otherwise stain, blemish or damage an untreated form of the same surface.

"clean", "cleansed", "cleanser" and "cleansing" either refers to surfaces that are unsoiled, unstained and free from soil buildup or the liquid cleansing/coating composition of this invention and the methods of using them.

"disinfectant" or "disinfecting" means any chemical agent used chiefly on inanimate surfaces to destroy or inhibit the growth of harmful organisms (germs).

"durable" or "durability" means long-lasting and not easily removed by washing and/or wiping using plain (tap) water, soap solutions, detergent solutions, household solvents, mildly abrasive (non-damaging) cleansers or conventional cleaner/degreasers.

"everyday household soil" means the spills, splatters and blemishes on a surface that result from cooking, eating, drinking, washing, bathing and showering such as milk, coffee, tea, juices, sauces, gravies, food boil over, soap scum, water spots, mineral deposits, etc.

"everyday surfaces" means the full range of surfaces in homes, offices, factories, public buildings and facilities, vehicles, aircraft and ships, and the like.

"everyday vehicular soil" means the spills, splatters and blemishes on the exterior of a vehicular surface that result from rain, sleet, snow, insects, mud and road grime, and on the interior of a vehicular surface that result from fingerprints, food spillage, plasticizer leaching, smoking, use of hair and deodorizing sprays and air circulation.

"germ(s)" means disease-producing microorganisms.

"HLB number" means an arbitrary scale number provided in supplier literature, and commonly understood in the trade, representing the contribution of the polar hydrophilic end and a non-polar hydrophobic end of the ethoxylated alcohol. More particularly, it is a "hydrophile-lipophile balance number", which is a number on the scale of one to 40 according to the HLB system, introduced by Griffin (1949* and 1954**). The HLB system is a semi-empirical method to predict what type of surfactant properties a molecular structure will provide. The HLB system is based on the concept that some molecules have hydrophilic groups, other molecules have lipophilic groups, and some have both. Weight percentage of each type of group on a molecule or in a mixture predicts what behavior the molecular structure will exhibit. Water-in-oil emulsifiers have low HLB numbers, typically around 4. Solubilizing agents have high HLB numbers. Oil-in-water emulsifiers have intermediate to high HLB numbers. *Reference (incorporated herein by reference): Griffin WC: "Classification of Surface-Active Agents by 'HLB,'" *Journal of the Society of Cosmetic Chemists* 1 (1949):311. ** Reference (incorporated herein by reference): Griffin W C: "Calculation of HLB Values of Non-Ionic Surfactants," *Journal of the Society of Cosmetic Chemists* 5 (1954): 259.

"insoluble soil", "soil", and "water and oil insoluble soil" mean surface soil and stains that cannot be effectively solublized and removed by washing with water, soaps, solvents and detergents and which can be removed by grinding or polishing the surface with the liquid cleansing coating compositions of this invention.

"massaging" refers to biomechanically wiping and/or scrubbing the liquid cleansing coating composition on and into the buildup until the soil is no longer attached to the surface.

"microorganism(s)" means any organism too small to be viewed by the unaided eye, such as bacteria, protozoa, virus and some fungi and algae.

"mitigate" means to lessen in force or intensity and make less severe; to mollify and control; particularly with respect to the attachment and growth of microorganisms.

"mold" and "mildew" mean the growth of minute fungi that forms on animate and inanimate surfaces and is generally associated with dampness and/or decay.

"monomer" or "monomeric" means a molecule capable of reacting with identical or different molecules or to form a compound or a polymer.

"multifunctional" means the process of achieving two or more discernable results from a single application, as in simultaneously or sequentially cleaning and coating a surface whereby the coating also performs the function(s) of rendering the surface water repellent, soil repellent and/or antimicrobial.

"nonreactive" refers to abrasive solid particles that do not react with the organosilane quaternary or hydrogen peroxide so as to diminish their cleansing and coating proportions in accordance with this invention; or, if reactive in their normal state, are coated with a variety of substances that form a barrier to make them nonreactive and storage stable to provide the desired surface cleansing and bonding functions.

"particle(s)" and "grit(s)" means minute pieces or fragments of solids with varying hardness, structure, texture and size used for the removal of insoluble soil.

"polymer" or "polymeric" means a compound of high molecular weight usually derived by the reaction/condensation of many smaller molecules.

"repel" or "repellent" mean to resist effectively, to keep off or out, to fail to mix with and to resist the absorption, attachment or passage of water, soil and germs.

"resistant to removal" means a coating or surface finish that is not easily removed by washing or cleaning with conventional soaps, solvents, detergents, mildly abrasive cleansers or cleaner/degreasers that would not otherwise etch or damage an untreated surface of the same composition and construction.

"sanitizer" or "sanitizing" mean a substance, preparation or process for cleaning a surface to render it free of from dirt, soil, germs, etc.

"soil repellent" means a surface that exhibits reduced adhesion to, and buildup of, for example, everyday household and vehicular soil both before and after evaporation of the water component.

"sterilant" or "sterilization" means any chemical agent, substance or process that causes the destruction of all living microorganisms.

"storage stable" refers to a useful shelf life of the liquid compositions of this invention when stored in containers under ambient environmental conditions of temperature as found in warehouses, shipping containers, packages, etc., up to 120° F. for months, typically desired for more than six months or at least one year.

"surface(s)" means the full range of hard or soft surfaces, rather porous or non-porous, siliceous or non-siliceous, as exemplified by everyday surfaces and such as those used in the following examples which illustrate the compositions and methods of this invention. Examples of such surfaces include, without limitation metal, glass, plastics, rubber, porcelain, ceramic, marble, granite, cement, tile, silica, enameled appliances, polyurethane, polyester, polyacrylic, melamine/phenolic resins, polycarbonate, siliceous, painted surfaces, wood, and the like.

"surfactant" and "surfactant-free" refers to a substance that reduces surface tension or interfacial tension between two liquids or a liquid and solid as listed in the Stepan Company, Northfield, Ill., 2004 "Global Product Catalog". It includes detergents, wetting agents and emulsifiers. The terms are meant to exclude an organosilane quaternary ammonium compound of the type used in this invention.

"thixotropic" or "thixotropically" means, with reference to a thickened composition, when applied to a vertical surface, it will cling until disturbed by wiping or massaging in biomechanical cleansing.

"virus" means an ultramicroscopic, metabolically inert infectious agent that replicates only within the cells of living hosts, mainly bacteria, plants and animals, but which are transferred by hand & body contact directly or indirectly through hand & body contact surfaces.

"water repellent" and "water repellency" as used herein describe the hydrophobic nature or characteristic of a surface and its ability to repel water as measured by the contact angle of a drop or droplet of distilled water on the surface. (Contact angles measured with rainwater, municipally furnished tap water or ground water are typically more variable and non-reproducible, and commonly measure up to 10° less than those using distilled or de-ionized water.) Generally, the hydrophobicity of a discrete surface is rated in terms of its contact angle to water drops as follows:

| | |
|---|---|
| Excellent | Compact drops, well rounded, with bright sparkles measuring 95° or more |
| Good | Less rounded drops, but bright sparkles that exhibit slight spread, measuring 85° to 95° |
| Fair | Visible flattening of the water drops, measuring 70° to 85° |
| Poor | Relatively flat water drops, exhibiting more spread of the water and measuring 50° to 70°. |

Preparation of Test Surfaces

All test surfaces were cleaned by scrubbing the surface with "Miracle Scrub", a non-scratching abrasive hard surface cleanser available from Unelko Corporation, Scottsdale, Ariz., and using a moist cellulose sponge. After cleaning, the surface was rinsed with hot water to remove the Miracle Scrub excess, followed by a rinse with deionized water (a clean surface can be noted when the water spreads and wets the surface) followed by drying with a paper towel. The cleaned surface was allowed to air dry at least 24 hours prior to application of the various insoluble soils.

Formation, Adhesion and Buildup of Insoluble Soils on the Test Surfaces

Hard Water Mineral Deposits: Hard water spots were formed by spraying Scottsdale, Arizona (hard) tap water onto the test surface in a horizontal position and allowing the water to evaporate, leaving hard water spots on the surface. The procedure was repeated until a substantial hard water spot residue remained on the test surface. The soiled test surface was then placed in a 250° F. oven for one hour to drive off any residual water from the surface.

"Majic Marker" Stains: "Majic Marker" (Eberhard Faber 300 permanent marker) soil was applied to the air dried hard water residue on the test surface and subjected to the 250° F. oven for one hour.

Soap Scum: An aqueous solution of "Ivory Soap" (Procter & Gamble), in Scottsdale, Ariz. hard water, was sprayed onto the test surface in a horizontal position and the water allowed to evaporate, leaving a soap scum soil on the surface. The procedure was repeated until a substantial soap scum soil residue remained on the test surface. The soiled test surface was then placed in a 250° F. oven for one hour to drive off any residual water from the surface.

Grease: "Crisco" spray (canola and soybean oils) was applied to the dried soap scum soiled test surface in a horizontal position until a substantial layer of grease residue remained on the test surface. The soiled test surface was then placed in a 250°-400° F. oven for one hour at which time the grease had begun to turn brown from slight charring.

The test soils were judged to be insoluble when they could not easily be removed when washing with common glass cleaners.

Test Surfaces

The test surfaces and insoluble soils formed were: glass (water spots and "Majic Marker" stains, and soap scum and grease), stainless steel (soap scum and grease), ceramic tile (water spots, "Majic Marker" and soap scum) and "Formica" (water spots, "Majic Marker" and soap scum).

EXAMPLES 1-17

The compositions of this invention were formulated from liquids (water, water thickened with 2% hydroxypropylcellulose and ethanol thickened with 2% hydroxypropylcellulose), various abrasives and various siliconized quaternaries. The examples were hand mixed to homogeneous slurries, gels and creams as discussed in the following Table II with reference to the C-8Q, C-12Q, C-18Q, C-18=Q, C=18Q and C-22Q quats labeled above.

The compositions were tested on various soiled surfaces by application of a small amount of the composition to the soiled surface and massaging the composition into the soil with a paper towel and a circular overlapping motion. The scrubbed surface was then rinsed with water to remove the excess composition and the loosened soil. The cleaned surface was dried and examined for any remaining soil and was tested for water repellency.

In all cases, no remaining soil could be observed on the cleansed surface and the surfaces were found to have either "Excellent" (E) or "Good" (G) water repellency.

TABLE II

| | EXAMPLE | | | | | | | | |
|---|---|---|---|---|---|---|---|---|---|
| | 1 | 2 | 3 | 4 | 5 | 6 | 7 | 8 | 9 |
| FORMULATION | | | | | | | | | |
| LIQUID | Aqueous Gel | Aqueous Cream | Aqueous Cream | Aqueous Cream | Aqueous Cream | Aqueous Cream | Aqueous Gel | Aqueous Slurry | Aqueous Slurry |
| ABRASIVE | Wallastonite[1] | $Al_2O_3$[2] | Ceramic[3] Spheres | Hydrated[4] $Al_2O_3$ | Mica[5] | Fused $Al_2O_3$[6] | $MgAlSiO_4$[7] | $A_c(OH)_3$[8] | $A_c(OH)_3$[9] |
| % by Weight | 20% | 25% | 25% | 14.3% | 14.3% | 8.5% | 14.3% | 25% | 25% |
| Average Particle Size | 40 mm | 5 mm | 12 mm | 17 mm | 8.5 mm | 25 mm | 4.2 mm | 27 mm | 45 mm |
| QUATERNARY | C-12Q | C-12Q | C-12Q | C-18Q | C-22Q | C-18=Q | C=18Q | C-12Q | C-8Q |
| % by Weight | 0.8% | 1.0% | 1.0% | 0.6% | 0.54% | 0.61% | 0.57% | 1.0% | 0.4% |
| PERFORMANCE | | | | | | | | | |
| WATER SPOTS[A] & MAJIC MARKER | E | G-E | E | G-E | E | G-E | E | E | E |
| GREASE[B] & SOAP SCUM | E | E | E | E | E | E | E | E | E |

[1]NyedG from NYCO
[2]SPA S5 K.C. Abrasives
[3]W-610 3M
[4]C-231 Almatis
[5]3X - H.M. Royal of California
[6]400 Electro Abrasives
[7]Minugel 400 Floridin
[8]OC-1500 Almatis
[9]OC-2000 Almatis
[A]Glass Surface
[B]Quarry Tile Surface

| | EXAMPLE | | | | | | | |
|---|---|---|---|---|---|---|---|---|
| | 10 | 11 | 12 | 13 | 14 | 15 | 16 | 17 |
| FORMULATION | | | | | | | | |
| LIQUID | Aqueous Slurry | Gelled Ethanol | Aqueous Gel | Aqueous Gel | Aqueous Gel | Aqueous Gel | Aqueous Gel | Aqueous Slurry |
| ABRASIVE | Barytes[10] | $Al_2O_3$[11] | Polypropylene[12] Wax | Polypropylene[13] Homopolymer | Coated[14] Wallastonite | Coated[15] Wallastonite | Coated[16] Wallastonite | Coated[17] $CaCO_3$ |
| % by Weight | 25% | 25% | 20% | 20% | 20% | 20% | 20% | 20% |
| Average Particle Size | 25 mm | 27 mm | 285 mm | 5-10 mm | 2.3 mm | 2.8 mm | 40 mm | ~5 mm |
| QUATERNARY | C-12Q | C-12Q | C-12Q | C-12Q | C-12Q | C-12Q | C-12Q | C-12Q |
| % by Weight | 1.0% | 1.0% | 1.0% | 1.0% | 1.0% | 1.0% | 1.0% | 1.0% |
| PERFORMANCE | | | | | | | | |
| WATER SPOTS[A] & MAJIC MARKER | E | E | E | E | E | E | E | E |
| GREASE[B] & SOAP SCUM | E | E | E | E | E | E | E | E |

[10]$BaSO_4$22 Cimbar
[11]OC-1500 Almetis
[12]Polytec 20 Microfiber
[13]N15P Eastman
[14]Vancoat 325AS R.T. Vanderbilt (coated with aminosilicone)
[15]Vancoat W50AS R.T. Vanderbilt (coated with aminosilicone)
[16]NYAOC Coated, Nyco
[17]Stearic Acid Coated
[A]Glass Surface
[B]Quarry Tile Surface

EXAMPLES 18-25

Additional compositions of this invention were formulated from liquids as defined in Examples 18-25. Various abrasives were formulated with 3-(trimethoxysilyl)propyldimethyloctadecyl ammonium chloride (C-18Q) and hydrogen peroxide. The examples were hand mixed to homogeneous gels, creams and liquids as defined in the following Table III.

The compositions were tested on the various soiled surfaces by application of a small amount of the composition to the soiled surface and biomechanically massaging the composition into the soil with a paper towel and a overlapping circular motion. The scrubbed surface was then rinsed with water to remove the excess composition and the loosened soil. The cleaned surface was dried and examined for remaining soil and water repellency.

In Examples 18-25, the compositions removed the water spots and majic marker stains and the cleaned surfaces were found to be excellent (E) with respect to water repellency or good to excellent (G-E).

In Example 25, the composition did not remove the grease and soap scum from the surface.

Comparative Bonding Test with and without Hydrogen Peroxide

The bonding test utilizes the retention of water repellency of the treated surface as a function of the degree of bonding after application of the composition to the surface followed by scrubbing of the surface with an abrasive cleaner that is capable of removing the repellent coating on the surface without scratching the surface. The degree of repellency was determined by the contact angle and appearance of water drops when applied to the scrubbed area on the surface. Coatings resulting from the application of compositions containing organic cationic species were compared to coatings resulting from the compositions containing the same organic cationic species and hydrogen peroxide.

A. Preparation of the Glass Test Surface

New 12"×12" glass mirrors were cleaned by scrubbing the surface with the soft cleanser "Miracle Scrub", a non-scratching abrasive hard surface cleaner available from Unelko Corporation, Scottsdale, Ariz., and using a moist cellulose sponge. After cleaning, the mirror surface was rinsed with hot water to remove the Miracle Scrub excess followed by a rinse with deionized water (a clean surface can be noted when the

TABLE III

| | EXAMPLE | | | | | | | |
|---|---|---|---|---|---|---|---|---|
| | 18 | 19 | 20 | 21 | 22 | 23 | 24 | 25 |
| FORMULATION | | | | | | | | |
| LIQUID | Aqueous Slurry | Aqueous Gel | Aqueous Cream | Aqueous Cream[26] | Ethanol Cream[27] | Aqueous Gel | Aqueous Cream | Aqueous Cream |
| ABRASIVE | Ceramic[18] Microspheres | Hydrated $Al_2O_3$[19] | Fused $Al_2O_3$[20] | Hydrated $Al_2O_3$[21] | Hydrated $Al_2O_3$[22] | Propylene[23] Wax | Polypropylene[24] Homopolymer | PP/PTFE[25] |
| % by Weight | 20% | 20% | 20% | 25% | 25% | 20% | 20% | 25% |
| Average Particle Size | 12 mm | 17 mm | 25 mm | 27 mm | 45 mm | 285 mm | 5-10 mm | 5-10 mm |
| QUATERNARY | C-18Q | C-18Q | C-18Q | C-18Q | C-18Q | C-18Q | C-18Q | C-18Q |
| % by Weight | 1.0% | 1.0% | 1.0% | 1.0% | 1.0% | 1.0% | 1.0%% | 1.0% |
| HYDROGEN PEROXIDE % by Weight | 3% | 3% | 3% | 3%[26] | 3% | 3% | 3% | 3% |
| PERFORMANCE | | | | | | | | |
| WATER SPOTS[A] & MAJIC MARKER | E | E | E | E | E | E | E | E |
| GREASE[B] & SOAP SCUM | E | G-E | G-E | E | G-E | E | E | did not remove grease |

[18]W-610, 3M
[19]C-231, Almatis
[20]400 Electro Abrasives
[21]OC1500, Almatis
[22]OC2000, Almatis
[23]Polytec 20, Microfiber
[24]N15P, Eastman
[25]Polyflus 19, Miropowder
[26]Peroxydone ™ K90 was employed as a thickener and peroxide source. Composition contains 13.2% Polyvinylpyrrolidone and 3% Hydrogen Peroxide
[27]Contains 63.43% ethanol as solvent
[A]Glass Surface
[B]Glass Surface water spreads and wets the surface) followed by drying with a paper towel. The cleaned mirrors were then allowed to air dry at least 24 hours.

B. Procedure

The two compositions formulated with the same organosilane cationic species with and without hydrogen peroxide were applied to the same 12"×12" mirror. One half of the mirror was wiped with one composition (containing hydrogen peroxide) and polished until dry. The other half of the mirror was then treated in the same manner with the other composition (free of hydrogen peroxide).

The mirror was then rinsed with tap water followed by deionized water to remove any excess composition from the surface. The mirror was then dried with a paper towel.

A small but equal amount of Miracle Scrub was applied to a section of each half of the treated mirror surface. A moist cellulose sponge was used to "scrub"the treated surface of each test half using a circular motion and a moderate pressure on the sponge. Ten circular motions were used on each area. The Miracle Scrub was then rinsed with tap water to remove the excess material followed by a deionized water rinse. The surfaces were then dried with a paper towel. The dried, scrubbed areas were evaluated for water repellency to determine the improvement in the bonded surface coating.

With the mirror in a horizontal position, several equal sized drops of deionized water were placed on the scrubbed areas of each test section of the mirror surface and evaluated for repellency. The contact angle of the drops along with the spreading of the drops were observed and rated as follows:

| | |
|---|---|
| Excellent: | Compact, well rounded, bright sparkle with excellent contact angle (95°+) |
| Good: | Somewhat less rounded with slight spread, bright with good contact angle (85-95°) |
| Fair: | Slight flattening with some spread and only fair contact angle (70-78°) |
| Poor: | Flat with spread and poor contact angle (70° or less) |

EXAMPLE 26

To determine the synergistic activity of the hydrogen peroxide and the organosilane quaternary compound in the presence of an abrasive, the formulation of Example 22 was repeated without hydrogen peroxide. The Comparative Bonding Test for the two formulations resulted in good repellency without hydrogen peroxide and excellent repellency with hydrogen peroxide thereby demonstrating synergism.

Those of ordinary skill in the art realize that the descriptions, procedures, methods and compositions presented above can be revised or modified without deviating from the scope of the described embodiments, and such do not depart from the scope of the invention.

EXAMPLES 27-33

Examples 27 to 33 of Table IV demonstrated the utility of various components used to achieve the desired thickened compositions. Examples 27 and 28 demonstrated that sodium dodecylbenzene sulfonate or aluminum oxide grit do not thicken the water mixture. Example 29 demonstrated that the alcohol ethoxylate ($C_{11}$-alkyl, 3 ethyleneoxides) does thicken water by itself, but Example 30 demonstrated that the grit in combination with the alcohol ethoxylate does not thicken the aqueous mixture even with a large excess of the alcohol ethoxylate. Example 31 also demonstrated that the grit in combination with sodium dodecylbenzenesulfonate did not thicken the aqueous mixture. Example 32 demonstrated that sodium decdecylbenzene sulfonate in combination with the alcohol ethoxylate did thicken the aqueous mixture. Example 33 demonstrated that the combination of the three components (sodium dodecylbenzene sulfonate, aluminum oxide grit and alcohol ethoxylate) yield a thickened aqueous mixture.

TABLE IV

Thickener Component Performance

| | EXAMPLE | | | | | | |
|---|---|---|---|---|---|---|---|
| Gms Component | 27 | 28 | 29 | 30 | 31 | 32 | 33 |
| Deionized Water[A] | 408 | 450 | 450 | 450 | 408 | 408 | 408 |
| Sodium Dodecylbenzene Sulfonate[A] | 42.4 | — | — | — | 42.4 | 42.4 | 42.4 |
| Aluminum Oxide[B] | — | 124 | — | 124 | 124 | — | 124 |
| Alcohol Ethoxylate[C] | — | — | 42 | 102 | — | 47 | 45 |
| Thixotropic | NO | NO | YES | NO | NO | YES | YES |

[A]Prepared as base
[B]$Al_2O_3$(A2-325), Almatis
[C]Tomadol 1-3, Tomah

Ethoxylated Alcohol Component

Ethoxylated alcohols can vary considerably in their chemical composition. The molecular contribution of the polar hydrophilic end (ethoxylate) and the nonpolar lipophilic (hydrophobic) end of the nonionic ethoxylated alcohols determine their utilization in various formulations. The contribution of the polar hydrophilic end and the nonpolar hydrophobic end of the ethoxylated alcohol is represented by an arbitrary scale known as the HLB number in supplier literature. High HLB nonionics tend to be more water soluble while the low HLB nonionics tend to be more oil soluble. The HLB number is directly related to the ethylene oxide content of the nonionic molecule.

Table V lists the various ethyoxylate alcohols employed in the inventive development, and lists them according to the HLB values assigned by the suppliers.

TABLE V

HLB of Ethoxylated Alcohols R—O($CH_2CH_2O$)$_x$H**

| PRODUCT | HLB | R—O— | ($CH_2CH_2O$) |
|---|---|---|---|
| Biosoft[A] N25-3 | 7.5-8.0 | $C_{12}$ to $C_{15}$ | 3 |
| Biosoft N24-3 | 8 | $C_{12}$ to $C_{14}$ | 3 |
| Biosoft N23-3 | 8.1 | $C_{12}$ to $C_{14}$ | 3 |
| Biosoft N91-2.5 | 8.5 | $C_9$ to $C_{11}$ | 2.5 |
| Tomadol[B] | 8.7 | $C_{11}$ | 3 |
| Makon[A] 4 | 9 | $C_{15}H_{24}$-* | 4 |
| Biosoft N1-5 | 11.2 | $C_{11}$ | 5 |
| Makon 8 | 12 | $C_{15}H_{24}$-* | 8 |
| Biosoft N25-7 | 12.2 | $C_{12}$ to $C_{15}$ | 7 |
| Tomadol 91-6 | 12.4 | $C_9$ to $C_{11}$ | 6 |
| Makon 9 | 12.9 | $C_{15}H_{24}$-* | 9 |
| Neodol[C] 25-12 | 14.4 | $C_{12}$ to $C_{15}$ | 12 |

[A]Stepan
[B]Tomah
[C]Shell Chemical
*Nonylphenol ethoxylate
**R = $C_9$-$C_{15}$ and x = about 2.5 to about 12

Examples 34 to 46 of Table VI include the various formulations employing the ethoxylated alcohols listed in Table V by increasing HLB numbers.

TABLE VI

Ethoxylated Alcohol Component Study

| | Example | | | | | | |
|---|---|---|---|---|---|---|---|
| | 34 | 35 | 36 | 37 | 38 | 39 | 40 |
| Deionized Water (g) | 408 | 408 | 408 | 408 | 408 | 408 | 408 |
| Sodium Dodecylbenzene Sulfonate (g) | 42.4 | 42.4 | 42.4 | 42.4 | 42.4 | 42.4 | 42.4 |
| Grit (g) | 124 | 124 | 124 | 124 | 124 | 124 | 124 |
| (Grade) | (A2-325) ($Al_2O_3$) | (P-6) ($Al_2O_3$) | (P-6) ($Al_2O_3$) | (P-6) ($Al_2O_3$) | (A2-325) ($Al_2O_3$) | (P-6) ($Al_2O_3$) | (A2-325) ($Al_2O_3$) |
| Linear Alcohol Ethoxylate (g)*** | 52 N25-3 | 58 N24-3 | 43 N23-3 | 45 N91-2.5 | 45.5 N1-3 | 47 N1-3 | 51.9 Makon 4** |
| (HLB) | 7.5-8.0 | 8 | 8.1 | 8.5 | 8.7 | 8.7 | 9 |
| THICKENS | YES | YES | YES | YES* | YES | YES | YES |

| | Example | | | | | |
|---|---|---|---|---|---|---|
| | 41 | 42 | 43 | 44 | 45 | 46 |
| Deionized Water (g) | 408 | 408 | 408 | 408 | 408 | 408 |
| Sodium Dodecylbenzene Sulfonate (g) | 42.4 | 42.4 | 42.4 | 42.4 | 42.4 | 42.4 |
| Grit (g) | 124 | 124 | 124 | 124 | 124 | 124 |
| (Grade) | (A2-325) ($Al_2O_3$) | (P-6) ($Al_2O_3$) | (P-6) ($Al_2O_3$) | (A2-325) ($Al_2O_3$) | (A2-325) ($Al_2O_3$) | (A2-325) ($Al_2O_3$) |
| Linear Alcohol Ethoxylate (g)*** | 74 N1-5 | 74 Makon 8** | 63 N25-7 | 92 N91-6 | 97 Makon 9** | 97.5 N25-12 |
| (HLB) | 11.2 | 12 | 12.2 | 12.4 | 12.9 | 14.4 |
| THICKENS | NO | NO | NO | NO | NO | NO |

*Flowable
**Nonylphenolethoxylate
***See TABLE V for suppliers and structure

The sodium dodecylbenzene sulfonate base employed in Examples 34-46 was prepared as follows: 90.07% (Wt.) of deionized water was placed in the blender beaker and 1.104% sodium hydroxide pellets added and the mixture stirred until all sodium hydroxide dissolved. 8.826% of dodecylbenzene sulfonic acid (98% purity) was added slowly with good stirring until all the dodecylbenzene sulfonic acid dissolved (reacted with the sodium hydroxide). The pH of the resulting solution was 3.The final solution contained 9.42% sodium dodecylbenzene sulfonate. Approximately 450 gms of the base, containing 408 gms of water and 42.4 gms of the sodium dodecylbenzene sulfonate, were used in all the examples of TABLE VI. 124 gms of aluminum oxide grit (A2-325 and P-6 grades from Altmatis) were employed in the compositions of TABLE VI.

The alkyl alcohol ethoxylates were added slowly with good mixing employing a Silverson L4RT-A laboratory mixer with the pump head mixer. As the mixture thickened, addition of the alkyl alcohol ethoxylates was slowed until the thickened mixture had the consistency of whipped cream. If the desired thickening was achieved, it was so noted as "YES", if not, it was noted as "NO". In Example 37, the mix resulted in a thixotropic mixture in which the grit did not separate.

It can be concluded from the results in TABLE VI that the desired HLB for the alcohol ethoxylate should be about 7.5 to about 9 (Examples 34-40). This includes alkyl groups of $C_{11}$ to $C_{15}$ and nonylphenyl hydrophobic groups with 2.5 to 4 ethoxylated hydrophilic groups. Examples 41-46 demonstrated that the same hydrophobic groups with 5 to 12 ethoxylated hydrophilic groups do not yield the desired thickener even at higher use levels (74-97.5 gms) than those that did (43 to 58 gms).

The percent by weight of the sulfonate varied from a low of 6.70 (Example 35) to a high of 6.86 (Example 36); whereas the percent by weight of ethoxylate varied from a low of 6.96% (Example 36) to a high of 9.20 (Example 35). Accordingly, TABLE VI supports an operable range (with following TABLES VII and VIII) of about 6 to 8 for the preferred sulfonate, about 6-11 for the ethoxylate, and a total percent of about 13 to 19 for thickener.

Sodium Sulfonate Component

It has been found that sodium sulfonates can vary considerably in their chemical structure and performance in the compositions evaluated in this invention. TABLE VII (Examples 47-51) demonstrated the results found for five different sulfonates evaluated as components in a product. The short chain alkyl sulfonates (sodium octane sulfonate-Example 49, sodium C(11-16) alkyl sulfonate (Example 50) and sodium lauryl (C12) sulfonate (Example 51) did not result in stable thickened compositions in a standard test formulation. Sodium dodecylbenzene sulfonate-Example 47, an 18 carbon aromatic sulfonate, and similar sodium alkylbenzene sulfonate-Example 48, did form stable thickened scrub compositions. The percent by weight for the sulfonate was 7.33 and for the ethoxylate was 7.87, with a total of 15.20 for the thickener of Example 47. In Example 48, the percent by weights for the same respective components were 6.51 and 8.80, for a total of 15.30.

TABLE VII

Sodium Sulfonate Component Study

| | Example | | | | |
|---|---|---|---|---|---|
| | 47[A] | 48 | 49 | 50 | 51 |
| Water (g) | 408 | 408 | 408 | 408 | 408 |
| Sulfonate (g) | 42.4[A] | 40.9[B] | 45.4[C] | 40.9[D] | 45.4[E] |
| $Al_2O_3$ Grit (g) (A2-325) | 124 | 124 | 124 | 124 | 124 |
| Alcohol Ethoxylate (g) N1-3 | 45.5 | 55.3 | 76.0 | 64 | 55.5 |
| THICKENS | YES | YES | NO | NO | NO |

[A]TABLE IV Sodium dodecylbenzene sufonate
[B]*Stepwet DF-90 Sodium alkylbenzene sulfonate (90%)
[C]*BioTerg PA5-85 Sodium octane sulfonate (38%)
[D]*BioTerg A5-90 Sodium $C_{14}$-$C_{16}$ olefin sulfonate (90%)
[E]*Stepanol ME Dry Sodium lauryl sulfate
*Stepan Company Testing of the Thickened Cleanser Compositions of this Invention for the Removal of Water Spots, Soap Scum and Stains and Grease from Glass Surfaces while Simultaneously Forming a Barrier Coating which is Water and Stain Repellent:

The test surfaces were cleaned as set forth above, and insoluble soils built up as in above, and the surfaces were evaluated for the removal of hard water spots, soap scum, stains, and grease, and for the presence of the barrier coating. Complete removal of the various soils, etc., along with the presence of the barrier coating on the cleaned surface were required to pass the test.

The results of these test procedures for some of the cleanser compositions of this invention are summarized in Table VIII.

TABLE VIII

Clean and Shield Formulations Employing Various Grits, Alcohol Ethoxylates, Sodium Sulfonates, and Siliconized Quaternary Compostions

| | Example | | | | | | | | |
|---|---|---|---|---|---|---|---|---|---|
| | 52 | 53 | 54 | 55 | 56 | 57 | 58 | 59 | 60 |
| Deionized Water (g) | 408 | 408 | 408 | 408 | 408 | 408 | 408 | 408 | 408 |
| Sodium Dodecylbenzene Sulfonate (g) | 42.4 | 42.4 | 42.4 | 42.4 | 42.4 | 42.4 | 42.4 | 42.4 | 40.9[F] |
| Grit | $Al_2O_3$[B] | $Al_2O_3$ | $Al_2O_3$[B] | Wallastonite[C] Ceramic Spheres | Wallastonite Ceramic Spheres | Wallastonite[D] Ceramic Spheres | $Al(OH)_3$[B] | Polypropylene[E] | $Al_2O_3$ |
| (type) | (P-6) | (P-6) | A2-325 | A2-325 | NYCO G | (W-610) | (OC-1500) | (NP15) | (A2-325) |
| gms | 55 | 124 | 55 | 124 | 124 | 124 | 124 | 70 | 124 |
| approx % | 10% | 20% | 10% | 20% | 20% | 20% | 20% | 12.2% | 20% |
| Ethoxylated Alcohol (g) | N1-3 | N24-3 | N1-3 | Malcon 4 | N1-3 | N25-3 | Malcon 4 | N1-3 | N1-3 |
| | 47.9 | 58 | 48.3 | 51.9 | 44.5 | 47 | 61.5 | 47.2 | 55.3 |
| THICKENS | YES | YES | YES | YES | YES | YES | YES | YES | YES |
| Siliconized Quat[A] | | | | | | | | | |
| C18Q (g) | 5.59 | | | 9.03 | 8.68 | | 8.92 | 5.73 | |
| C12Q (g) | | 6.39 | 5.59 | | | 6.27 | | | 5.74 |
| (approx %) | 0.7 | 1.0 | 1.0 | 1.0 | 1.0 | 1.0 | 1.0 | 1.0 | 0.9 |
| PERFORMANCE | | | | | | | | | |
| Water Repellent | YES | YES | YES | YES | YES | YES | YES | YES | YES |
| Stain Repellent | YES | YES | YES | YES | YES | YES | YES | YES | YES |
| Stain Removal | YES | YES | YES | YES | YES | YES | YES | YES | YES |
| Water Spots Removal | YES | YES | YES | YES | YES | YES | YES | YES | YES |
| Soap Scum Removal | YES | YES | YES | YES | YES | YES | YES | YES | YES |
| Barrier Coating Applied | YES | YES | YES | YES | YES | YES | YES | YES | YES |
| Grease Removal | YES | YES | YES | YES | YES | YES | YES | YES | YES |
| Barrier Coating Applied | YES | YES | YES | YES | YES | YES | YES | YES | YES |

[A]C18Q = 72% 3(trimethoxysilyl)propyldimethyloctadecyl ammonium chloride - (Dow Corning) C12Q = 100% 3(trimethoxysilyl)propyldimethyldodecyl ammonium chloride - (Siltech)
[B]Almatis
[C]NYCO
[D]3M
[E]Eastman
[F]Stepwet DF-90 Sodium alkylbenzene sulfonate As demonstrated by TABLE VIII, the thickened compositions of this invention are very effective as cleansing compositions and provide a barrier coating. In Examples 52-60, the % by weight of the sulfonate varied from a low of 6.51 (Example 60) to a high of 7.71 (Example 56); hereas the percent by weight of the ethoxylate varied from a low of 8.09 (Example 56) to a high of 10.86 (Example 58). Again, for the preferred operable thickener composition, the ranges of the sulfonate varied from about 6 to about 8, and the ethoxylate from about 6 to about 11, with the total percent by weight within the range of about 13 to about 19.

Those of ordinary skill in the art realize that the descriptions, procedures, methods and compositions presented above can be revised or modified without deviating from the scope of the described embodiments, and such do not depart from the scope of the invention.

What is claimed is:

1. A thickened surfactant-free storage stable liquid cleansing and multifunctional coating composition for treating a surface consisting essentially of
    a cationic organosilane quaternary ammonium compound which is bondable onto said surface,
    abrasive solid particles, said abrasive solid particles being nonreactive with said quaternary compound,
    a thickener composition of a water soluble alkylaryl sufonate and an ethoxylated alcohol having an HLB number of about 7 to about 11, and
    a liquid diluent, said composition free of other surfactants, said components in effective amounts for cleansing said surface and for bonding a multifunctional coating onto said surface thereby rendering it water and soil repellent.

2. The composition of claim 1 wherein said quaternary compound has a $C_8$-$C_{22}$ saturated or unsaturated hydrocarbon group.

3. The composition of claim 1 wherein said quaternary compound is in an amount up to about 5% by weight, said abrasive particles are in an amount up to about 35% by weight, said thickener composition in an amount up to about 25% by weight.

4. The composition of claim 3 wherein said abrasive particles are in an amount of from about 5 to about 25% by weight.

5. The composition of claim 1 wherein said diluent is selected from the group consisting of water and an alcohol, and mixtures thereof.

6. The composition of claim 1 wherein said quaternary compound is in an amount up to about 1% by weight and said abrasive particles are in an amount up to about 35% by weight.

7. The composition of claim 1 in the form of a slurry, cream or a gel.

8. The composition of claim 7 containing a diluent selected from the group consisting of an alcohol and water, and mixtures thereof.

9. The composition of claim 8 wherein the slurry, cream or gel has a pH on the order of about 2 to about 9.

10. The composition of claim 9 wherein the slurry, cream or gel contains deionized water.

11. The composition of claim 1 or 7 further containing an additive selected from the group consisting of a gelling agent, lubricant and solvent, and mixtures thereof.

12. The composition of claim 11 containing said additive in an amount of from about 1 to about 70% by weight.

13. The composition of claim 1 wherein said nonreactive abrasive particles are coated or uncoated.

14. The composition of claim 1 wherein said nonreactive abrasive particles are selected from the group consisting of silicas, silicates, metal oxides, metal carbonates, clays, carbides, metal hydroxides, urea, ceramic microspheres, hollow glass microspheres, and plastics.

15. The composition of claim 13 wherein said particles have an average size on the order of about 5 microns to about 300 microns.

16. The composition of claim 1 wherein said alkylaryl sulfonate is selected from the group consisting of sodium decylbenzene sulfonate and sodium dodecylbenzene sulfonate
    and said ethoxylated alcohol is selected from the group as defined by the formula

where R=$C_9$-$C_{15}$ and x= about 2.5 to about 12.

17. The composition of claim 1 wherein said quaternary compound is defined by the formula

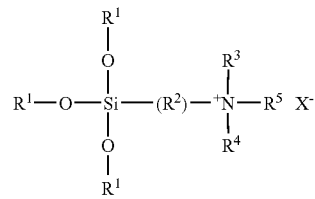

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_8$ to $C_{22}$ saturated or unsaturated hydrocarbon radical and X=halide, carboxylate, sulfonate, hydroxide, sulfate, or phosphate.

18. The composition of claim 1 containing hydrogen peroxide or a complex thereof.

19. The composition of claim 18 wherein hydrogen peroxide is in an amount up to about 8% by weight, said quaternary compound is in an amount up to about 5% by weight, said abrasive particles are in an amount up to about 35% by weight, and said thickener is in an amount up to about 25% by weight.

20. The composition of claim 19 wherein said hydrogen peroxide or complex thereof is in an amount from about 1 to about 3% by weight of hydrogen peroxide, said quaternary compound is in an amount up to about 1% by weight, and said thickener is in an amount of about 6 to about 25% by weight.

21. The composition of claim 19 wherein said abrasive particles, mixtures or blends thereof, are in an amount from about 5 to about 35% by weight.

22. The composition of claim 1 wherein said components are in effective amounts for cleansing said surface and for bonding a multifunctional coating onto said surface thereby rendering it (a) water and soil repellant and (b) antimicrobial.

23. A thickened surfactant-free storage stable cleansing and multifunctional liquid coating composition for treating a surface consisting essentially of a monomeric cationic organosilane quaternary ammonium compound which is bondable onto said surface in an amount up to about 5% by weight defined by the formula:

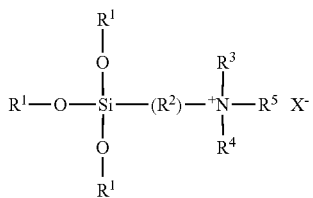

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_8$ to $C_{22}$ saturated or unsaturated hydrocarbon radical and X=halide, carboxylate, sulfonate, hydroxide, sulfate, or phosphate, abrasive solid particles in an amount up to about 35% by weight, said particles being nonreactive with said quaternary compound, a thickener composition of a water soluble alkylaryl sufonate and an ethoxylated alcohol having an HLB number of about 7.5 to about 9, said components in effective amounts for cleansing said surface and for bonding a multifunctional coating onto said surface thereby rendering it water and soil repellent, and a liquid diluent, said composition free of other surfactants.

24. The composition of claim 23 wherein said organosilane quaternary ammonium compound is selected from the group consisting of 3-(trimethoxysilyl)propyldimethyloctadecyl ammonium chloride, 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleylammonium chloride, 3-(trimethoxysilyl)propyloctadecyl ammonium chloride, 3-(trimethoxysilyl)propyloleyl ammonium chloride, 3-(trihydroxysilyl)propyldimethyloctadecyl ammonium chloride, 3-(trimethoxysilyl)propyldocosane ammonium chloride, and 3-(trimethoxysilyl)propyldimethyloctyl ammonium chloride.

25. The composition of claim 23 wherein said abrasive particles are in an amount from about 5 to about 25% by weight.

26. The composition of claim 23 wherein said diluent is selected from the group consisting of water and an alcohol, and mixtures thereof.

27. The composition of claim 23 wherein said quaternary compound is in an amount up to about 1% by weight, abrasive particles are in an amount up to about 35% by weight, said thickener composition in an amount up to about 25% by weight.

28. The composition of claim 23 in the form of a slurry, cream or a gel.

29. The composition of claim 28 containing a diluent selected from the group consisting of an alcohol and water, and mixtures thereof.

30. The composition of claim 29 wherein the slurry, cream or gel has a pH on the order of about 2 to about 9.

31. The composition of claim 30 wherein the slurry, cream or gel contains deionized water.

32. The composition of claim 23 or 28 further containing an additive selected from the group consisting of a gelling agent, lubricant and solvent, and mixtures thereof.

33. The composition of claim 32 containing said additive in an amount from about 6 to about 70% by weight.

34. The composition of claim 23 wherein said nonreactive abrasive particles are coated or uncoated.

35. The composition of claim 23 wherein said nonreactive abrasive particles are selected from the group consisting of silicas, silicates, metal oxides, metal carbonates, clays, carbides, metal hydroxides, urea, ceramic microspheres, hollow glass microspheres, and plastics.

36. The composition of claim 35 wherein said particles have an average size on the order of about 5 microns to about 300 microns.

37. The composition of claim 23 containing hydrogen peroxide or a complex thereof.

38. The composition of claim 37 wherein hydrogen peroxide is in an amount up to about 8% by weight, said quaternary compound is in an amount up to about 5% by weight, said abrasive particles are in an amount up to about 35% by weight and said thickener is in an amount of up to about 25% by weight.

39. The composition of claim 38 wherein said hydrogen peroxide or complex thereof is in an amount from about 1 to about 3% by weight of hydrogen peroxide and said quaternary compound is in an amount up to about 1% by weight.

40. The composition of claim 38 wherein said abrasive particles, mixtures or blends thereof, are in an amount of from about 5 to about 25% by weight.

41. The composition of claim 23 wherein said components are in effective amounts for cleansing said surface and for bonding a multifunctional coating onto said surface thereby rendering it (a) water and soil repellant and (b) antimicrobial.

42. A method for cleansing a soiled surface and providing it with a multifunctional coating comprising applying to the soiled surface a liquid composition consisting essentially of a cationic organosilane quaternary ammonium compound which is bondable onto said surface, abrasive solid particles, said abrasive solid particles being nonreactive with said quaternary compound, a thickener composition of a water soluble alkylaryl sufonate and an ethoxylated alcohol having an HLB number of about 7 to about 11, and a liquid diluent, said composition free of other surfactants, said components in effective amounts for cleansing said surface and for bonding a multifunctional coating onto said surface thereby rendering it water and soil repellent, massaging said composition on said surface for the removal of said soil and forming a clean, water and soil repellant coating bonded onto said surface.

43. The method of claim 42 wherein said quaternary compound has $C_{10}$-$C_{22}$ saturated or unsaturated hydrocarbon group.

44. The method of claim 42 wherein said quaternary compound is in an amount up to about 1% by weight and said abrasive particles are in an amount up to about 35% by weight, said thickener composition in an amount up to about 25% by weight.

45. The method of claim 44 wherein said quaternary compound is in an amount up to about 0.4 to 0.7% by weight and said abrasive particles are in an amount up to about 25% by weight.

46. The method of claim 42 wherein the composition is applied in the form of a slurry, cream or a gel.

47. The method of claim 46 wherein said composition contains an additive selected from the group consisting of a gelling agent, solvent and lubricant, and mixtures thereof.

48. The method of claim 47 wherein said nonreactive abrasive particles are selected from the group consisting of silicas, silicates, metal oxides, metal carbonates, clays, carbides, metal hydroxides, urea, ceramic microspheres, hollow glass microspheres, and plastics.

49. The method of claim 41 wherein said quaternary compound is defined by the formula:

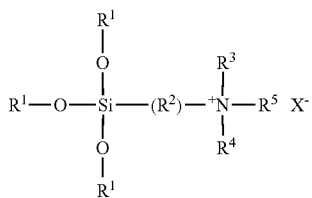

wherein $R^1$=hydrogen and/or $C_1$ to $C_4$ alkyl; $R^2$=divalent hydrocarbon radical with $C_1$ to $C_8$ carbon atoms, $R^3$=hydrogen or $C_1$ to $C_4$ alkyl, $R^4$=hydrogen or $C_1$ to $C_{10}$ alkyl, $R^5$=$C_8$ to $C_{22}$ saturated or unsaturated hydrocarbon radical and X=halide, carboxylate, sulfonate, hydroxide, sulfate, or phosphate.

50. The method of claim 42 wherein said composition contains hydrogen peroxide or a complex thereof.

51. The method of claim 50 wherein said composition contains hydrogen peroxide in an amount up to about 8% by weight.

52. The method of claim 51 wherein said hydrogen peroxide is in an amount of from about 1 to about 3% weight.

53. The method of claim 42 wherein said components are in effective amounts for cleansing said surface and for bonding a multifunctional coating onto said surface thereby rendering it (a) water and soil repellant and (b) antimicrobial.

54. The method of claim 42 wherein said organosilane quaternary ammonium compound is selected from the group consisting of 3-(trimethoxysilyl)propyldimethyloctadecyl ammonium chloride, 3-(trimethoxysilyl)propyldidecylmethyl ammonium chloride, 3-(trimethoxysilyl)propyltetradecyldimethyl ammonium chloride, 3-(trimethoxylsilyl)propyldimethylsoya ammonium chloride, 3-(trimethoxysilyl)propyldimethyloleyl ammonium chloride, 3-(trimethoxysilyl)propyloctadecyl ammonium chloride, 3-(trimethoxysilyl)propyloleyl ammonium chloride, 3-(trihydroxysilyl)propyldimethyloctadecyl ammonium chloride, 3-(trimethoxysilyl)propyldocosane ammonium chloride, and 3-(trimethoxysilyl)propyldimethyloctyl ammonium chloride.

55. The method of claim 42 wherein said thickener is an alkylaryl sulfonate selected from the group consisting of sodium decylbenzene sulfonate and sodium dodecylbenzene sulfonate and said ethoxylated alcohol is selected from the group as defined by the formula $$R-O(CH_2CH_2O)_xH$$

where R=$C_9$-$C_{15}$ and x=about 2.5 to about 12.

56. The method of claim 55 wherein said sulfonate is in an amount of about 6 to about 8% by weight and said ethoxylate is in an amount of about 6 to about 11% by weight.

* * * * *